(12) United States Patent
Taylor et al.

(10) Patent No.: US 8,127,070 B2
(45) Date of Patent: Feb. 28, 2012

(54) PROGRAMMABLE I/O INTERFACE

(75) Inventors: Richard David Taylor, Eagle, ID (US);
Mark David Montierth, Meridian, ID (US); Douglas Gene Keithley, Boise, ID (US)

(73) Assignee: Marvell International Technology Ltd., Hamilton (BM)

( * ) Notice: Subject to any disclaimer, the term of this patent is extended or adjusted under 35 U.S.C. 154(b) by 0 days.

(21) Appl. No.: 13/175,481

(22) Filed: Jul. 1, 2011

(65) Prior Publication Data

US 2011/0307634 A1    Dec. 15, 2011

Related U.S. Application Data

(63) Continuation of application No. 10/826,886, filed on Apr. 15, 2004, now Pat. No. 7,975,094.

(51) Int. Cl.
*G06F 13/00* (2006.01)
*G06F 3/00* (2006.01)

(52) U.S. Cl. ...................................... 711/100; 715/700
(58) Field of Classification Search .................. None
See application file for complete search history.

(56) References Cited

U.S. PATENT DOCUMENTS 5,381,538 A * 1/1995 Amini et al. .................. 711/156
(Continued)

FOREIGN PATENT DOCUMENTS

| DE | 19654588 A1 | 7/1997 |
| DE | 10005977 A1 | 8/2001 |
| EP | 0023568 A2 | 2/1981 |

(Continued)

*Primary Examiner* — Twyler Haskins
*Assistant Examiner* — Marcus T Riley

(57) ABSTRACT

The invention provides an architecture and method for implementing a programmable I/O interface. The primary function provides a generic reconfigurable interface for serial communications between a laser printer controller and the print mechanism. The design also supports vertical page synchronization (top of page detection).

11 Claims, 2 Drawing Sheets

U.S. PATENT DOCUMENTS

| | | | |
|---|---|---|---|
| 5,631,637 A | 5/1997 | Ueda | |
| 5,696,917 A * | 12/1997 | Mills et al. | 711/1 |
| 6,029,239 A * | 2/2000 | Brown | 712/1 |
| 6,049,346 A | 4/2000 | Cho | |
| 6,112,275 A * | 8/2000 | Curry et al. | 711/100 |
| 6,762,733 B2 | 7/2004 | Smith et al. | |
| 2003/0098897 A1 | 5/2003 | Hoshino et al. | |
| 2003/0131307 A1 | 7/2003 | Taylor et al. | |
| 2005/0206921 A1 | 9/2005 | Aruga et al. | |

FOREIGN PATENT DOCUMENTS

| | | |
|---|---|---|
| EP | 1213653 A2 | 6/2002 |
| EP | 1282041 A2 | 2/2003 |
| JP | 63-021670 | 1/1988 |
| JP | 03-048754 | 1/1991 |
| JP | 04368875 | 12/1992 |
| JP | 2002-268471 | 9/2002 |
| JP | 2005111932 | 4/2005 |

* cited by examiner

PROGRAMMABLE I/O INTERFACE

CROSS-REFERENCE TO RELATED APPLICATIONS

This present application is a continuation of U.S. application Ser. No. 10/826,886 filed Apr. 15, 2004 titled, "PROGRAMMABLE I/O INTERFACE," now U.S. Pat. No. 7,975,094, issued Jul. 5, 2011. The specification of said application is hereby incorporated in its entirety, except for those sections, if any, that are inconsistent with this specification.

BACKGROUND

In the prior art, a laser printer controller is designed specifically for a dedicated print mechanism communications state machine. Thus, an application specific integrated circuit (ASIC) must be redesigned when the engine interface specification changes or when a mechanism from a different vendor is used. In addition, a laser print controller may use I/O interfaces, such as serial, parallel, control area network (CAN), and front panel with dedicated fixed function hardware. Because the functionality of the interface is fixed in a given ASIC, the flexibility is limited, and it may be unable to support changes in the protocol of a given interface. In addition, if alternate functionality is desired, the ASIC must be redesigned. For interfaces that are not well defined prior to the onset of ASIC development, the Programmable I/O can reduce implementation risk and provide time-to-market advantages.

SUMMARY

The present invention defines a programmable I/O subsystem architecture that can be used to implement a variety of I/O protocols. It is well suited for the implementation of communication interfaces between laser printer controllers and laser printer mechanism controllers. The I/O subsystem is attached to the main system processor via a traditional bus structure and may be included within a single integrated circuit or in separate integrated circuits. The I/O subsystem consists of a simple microcontroller, code store SRAM that contains the executable code, a run control register which is set by the main system CPU to enable the subsystem, and a specialized dual-port register file.

The simple microcontroller includes a simple instruction set that allows it to emulate basic state machine constructs. The architecture as described herein includes a dual-port register file that allows single-cycle read-modify-write accesses for the most efficient emulation of I/O state machines. However, a traditional microcontroller could alternatively be used with traditional registers.

The code store RAM is loaded with executable microcontroller code from the main processor prior to being enabled via the run control register. After the microcontroller is enabled, the microcontroller executes the instruction sequence stored in this memory. Although external arbitrated memory could be used for some applications, the local memory is preferable for fast and repeatable state machine sequencing of the microcontroller. Since the executable "state machine" code is downloaded by the applications processor, the I/O subsystem is configurable at run time.

The specialized dual-port register file contains a number of features that enable the I/O subsystem to efficiently implement a wide variety of protocols. The register file includes a bank of general-purpose registers, timer registers, external I/O interface registers, internal I/O registers, shared registers, an interrupt register, and an optional DMA FIFO that are used by the microprocessor for data storage. The timer registers provide real-time control and measurement of timing sequences. The external I/O interface registers with edge detection capability allows the microcontroller to sample and/or control the I/O signals that comprise the protocol.

The internal I/O interface registers can optionally be used to interface the programmable I/O system to a dedicated hardware block. The bank of shared registers, with an access protocol, which are jointly accessible by both the microcontroller and the main system CPU. An interrupt register allows interrupts to be passed from the I/O subsystem to the main CPU. The optional DMA FIFO allows efficient bulk data transfer from the I/O subsystem to/from the main system memory with minimal main system processor intervention.

DETAILED DESCRIPTION

The invention provides an architecture and method for implementing a programmable I/O interface. The primary function provides a generic reconfigurable I/O interface. The interface can be used for communications between a laser printer controller and the print mechanism, or it can be used to implement a variety of standard or custom communications interface, e.g. serial interfaces, parallel interfaces, serial peripheral interface (SPI), Synchronous Serial Interface (SSI), MicroWire, Inter Integrated Circuit (12C), control area network (CAN), UART, IEEE1284, LCD interface, front panel interface, and MODEM.

Figure 1:
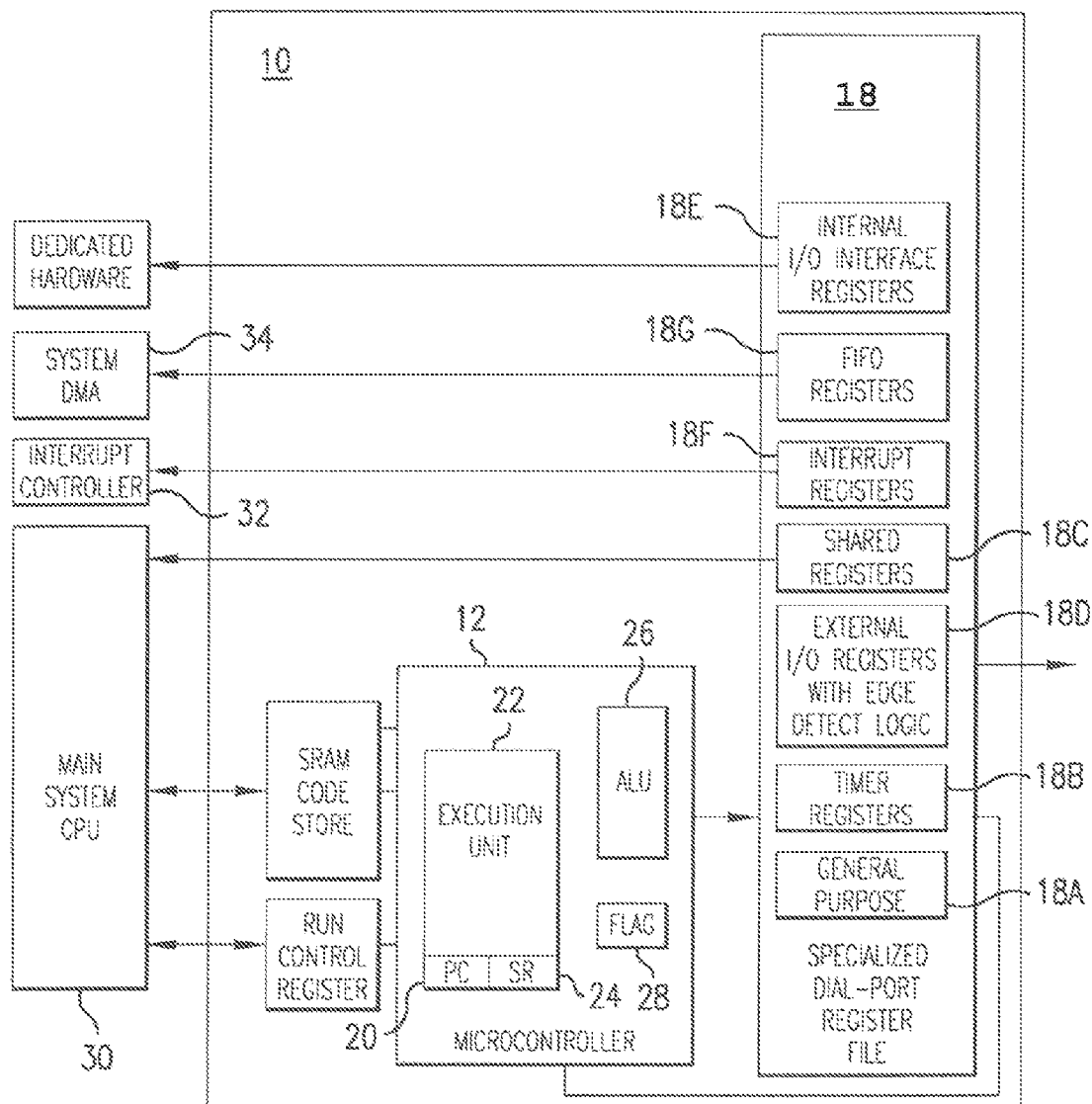
FIG. 1 illustrates a system according to the present invention.

The invention 10, as shown in FIG. 1, is attached as a peripheral in a traditional microprocessor-based embedded system. It may be included in the same integrated circuit as the main microprocessor, or it may be in a separate integrated circuit. The invention is connected to the main microprocessors bus as a peripheral. It also attaches to the system interrupt controller and optionally to a system direct memory access (DMA) controller. As an additional option, in some cases it may also attach to a dedicated hardware feature in the integrated circuit. For example, in a video system, the invention may be used to detect synchronization pulses pertaining to a video stream.

The invention may extract the complex synchronization information and pass the simplified synchronization information to a dedicated video output controller. In a laser printer, this synchronization would include the vertical page synchronization that is passed to the laser modulation controller.

The architecture 10, shown in FIG. 1, consists of four main elements. A microcontroller 12, a code store SRAM 14, a run control register 16, and a specialized dual-port register file 18.

The microcontroller 12 includes a minimal instruction subset to emulate basic state machine constructs. To illustrate, a minimum subset can include branches, conditional branches, loops, move, increment/decrement, comparison, and simple Boolean operations. For code efficiency, a single-level stack register 24 may be included to permit single-depth subroutines. As shown on the invention diagram, an illustrative microcontroller 12 consists of a program counter (PC) 20 indicating the location in the code store 14 that is being executed, an execution unit 22 that decodes the micro-coded instruction from the code store, a stack register 24 which can store a single return address, a single-cycle arithmetic logic unit (ALU) 26 that can operate on data presented from the code store and/or current values of the register file 18, and a flag 28 which stores the result of the previous instruction for conditional branching.

The executable machine code can be generated by a simple assembler. Freeware assemblers are available which can be configured to support a simple microcontroller by editing a include file that defines the opcodes and machine instruction format. A listing and symbol table is created by the assembler to help debug the code.

The code store SRAM 14 is used to contain the machine instructions that will be executed by the microcontroller 12. The code store SRAM 14 is loaded by the main system microprocessor 30 at run time. From the microcontroller 12 perspective, it is a read-only memory. After the main processor 30 has loaded the code, it signals the microcontroller 12 to begin executing instructions via the run control register 16. As an alternative implementation, an arbitrated system memory (not shown), e.g. DRAM, could be used to store the executable code. However, this is less preferable since it would reduce the state machine performance and may not yield the repeatable results that may be required to implement an I/O protocol. The I/O protocol, e.g. system programming interface (SPI), Inter Integrated Circuit (I2C), control area•network (CAN), RS232, IEEE1284, front panel, and MODEM, is defined by the executable "state machine" code.

The heart of the invention is the specialized register file 18. The register file 18 is what allows the invention to operate efficiently as an I/O subsystem with minimal overhead on the main system processor. In effect, these features allow the programmable I/O to appear very much like a dedicated hardware peripheral. The invention provides capabilities that are normally found in a dedicated hardware peripheral, including peripheral status/configuration/control registers, interrupt capability, and DMA capability for bulk data transfer.

Ideally, the specialized register file 18 is dual-ported to allow the simple microcontroller 12 to perform read-modify-write operations for code-size efficiency and performance. The register file 18 may include a bank of general-purpose microcontroller registers 18A, timer registers 18B, external I/O interface registers 18D, internal I/O registers 18E, shared registers 18C, an interrupt register 18F, and an optional DMA FIFO 18G that are used by the microprocessor 30 for data storage.

The general-purpose microcontroller registers 18A are used for local variables and storage.

The Timer Registers 18B are similar to the General Purpose Registers 18A. They may be configured to increment independently based on a selected system timebase (e.g. 1 us, 10 us, 100 us, 1 ms, 10 ms, and 100 ms). They are used to generate timing for the protocol to be implemented and for detecting protocol timeout errors. The registers may be configured to stop at a predetermined terminal count or can be free running.

The shared registers 18C may be accessed by both the main system processor 30 as well as the I/O microcontroller 12. They are used to emulate the peripheral status/configuration/control registers that appear in a traditional hardware peripheral. For efficiency, the registers 18C may be accessed differently by the main processor 30 and the microcontroller 12. For example, the main processor 30 may read four byte-wide registers at once as a single 32-bit word, whereas, the microcontroller 12 may access them as 4 separate 8-bit entities. In order to efficiently and safely implement a status/protocol in these registers 18C, an access priority is specified which grants write access for a particular register to either the main processor 30 or the microcontroller 12. The method for access priority control is specified in a separate patent application disclosed by Richard Taylor, "Register Access Protocol for Multi-Processor Systems", assigned to Agilent Technologies, filed 11 Mar. 2004 with the United States Patent and Trademark Office.

The external I/O interface registers 18D allow the microcontroller 12 to observe and control the actual external electrical signals that comprise the protocol of the communications that is to be implemented. These registers 18D include additional functionality to permit efficient implementation of the control state machine in the microcontroller 12. Registers 18D are provided so that each signal can be defined as an input, output, or bidirectional signal. If input, the state of the signal can be read. Synchronizers are provided on each input to prevent asynchronous issues. In addition, optional edge detect logic is provided to indicate if a rising or falling edge has occurred on the input signal. The transition detection is particularly valuable if the I/O protocol consists of pulses that could otherwise have been missed. When a signal is used as on output, the output level and output enable is directly controlled by the registers 18D.

The internal I/O interface registers 18E. This provides a similar function to the external I/O interface registers 18E, except that it allows the I/O subsystem to communicate with internal dedicated function blocks. This is useful when the purpose of the programmable I/O subsystem is to serve as a flexible intermediary between an external protocol and an internal fixed-function peripheral. As an example, for a laser printer controller, there is a dedicated laser printer modulation output controller that creates a serial video bitstream that fires the laser. The bitstream must be synchronized to the actual position of the photosensitive drum and the paper. The method of horizontal and vertical synchronization varies among the available print mechanisms. Some mechanisms may provide a single vertical synchronization signal, others may require the vertical synchronization to be inferred by the presence of a horizontal synchronization signal, or others may provide numerous vertical synchronization signals for multiple drums. The I/O subsystem may be used to decode the synchronization implemented in a particular mechanism and translate it to a consistent synchronization interface to the dedicated modulation controller. The programmable nature of the invention allows the design to support a variety of mechanisms, as well as mechanisms that have not yet been defined.

The interrupt register 18F would allow the I/O subsystem to provide interrupt-driven status to the main processor 30, as would a traditional peripheral. In actual implementation, the interrupt register 18F may be included in the shared registers 18C, with additional dedicated interrupt signals to the main system processor 30.

The FIFO 18G allows bulk data transfer to be completed between the I/O subsystem and system memory with minimal support required by the main system processor 30. Data written to the FIFO 18G by the microcontroller 12 is transferred via DMA 34 to the main system memory (not shown). Likewise, incoming DMA data may be read by the microcontroller 12. The run control register 16 may include a feature to clear the contents of the FIFO 18G.

Given the programmable nature of the invention, different communication protocols can be supported with a single design. ASIC designs can be completed before the communications protocol is fully defined. The controller, interface timing, and protocol may be modified late in the design cycle or in the field. Higher degrees of hardware assist may be implemented. The design can be used to implement new interfaces that were not yet conceived at the time the ASIC design was released.

Figure 2:
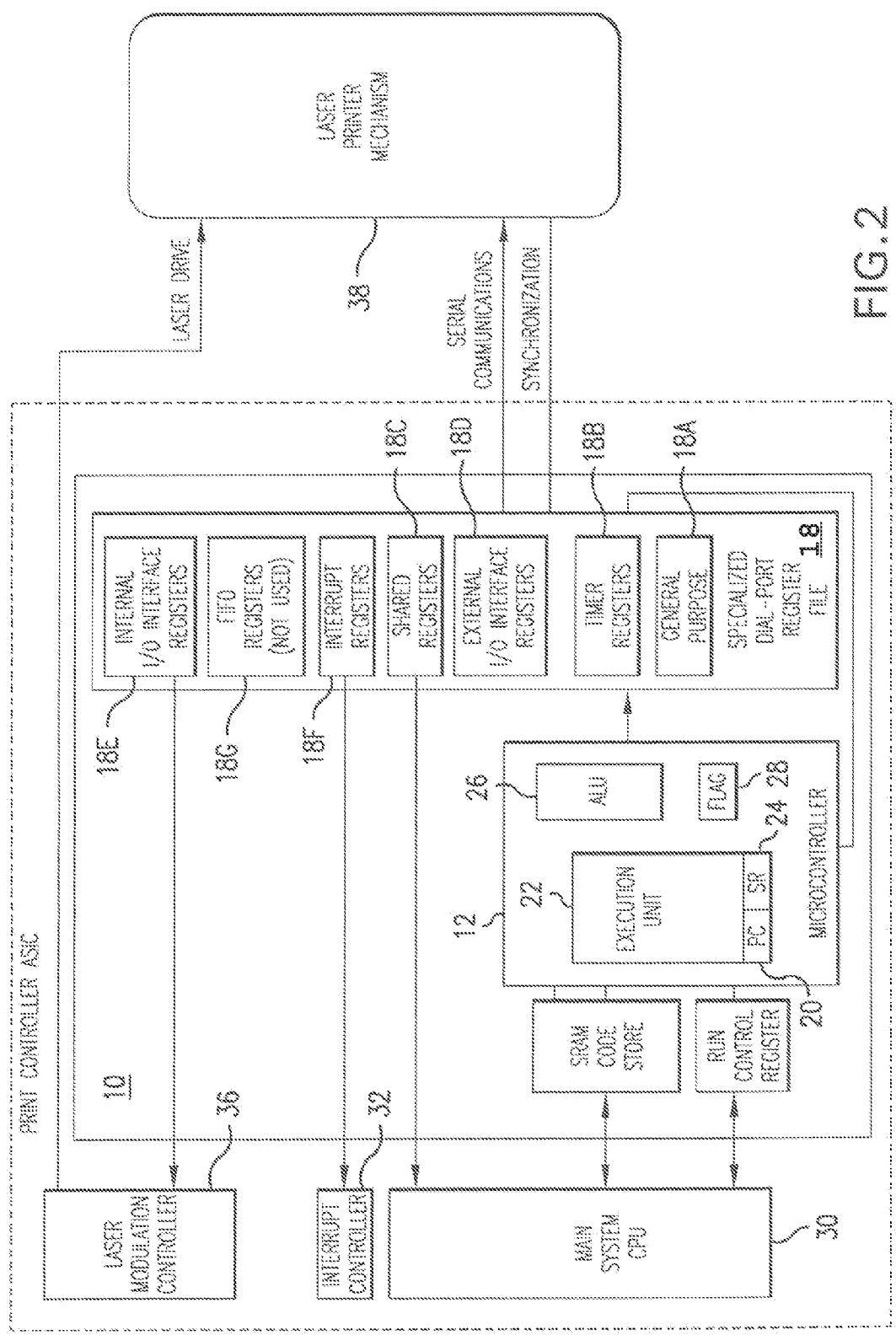
FIG. 2 illustrates an example implementation for a laser printer.

The invention is particularly suited for laser printers. In an example implementation, shown in FIG. 2, a single controller 12 is used to provide both the serial command/status channel between the laser modulation controller 36 and the mechanism controller (separate integrated circuit) 38, as well as the vertical page synchronization. The design supports a variety of color and monochrome print mechanisms with varying numbers laser beams, due to the ability to download different synchronization protocols.

The invention claimed is:

1. A programmable I/O system configured to implement a communication interface between i) a laser printer controller and ii) a print mechanism, the programmable I/O system comprising:
a memory configured to be loaded, during runtime of the laser printer controller and the print mechanism, with executable code for configuring the programmable I/O system to implement the communication interface;
a microcontroller configured to execute, during the runtime of the laser printer controller and the print mechanism, the executable code loaded into the memory; and
a register file in communication with the microcontroller, wherein the register file comprises a timer register, a shared register, an interrupt register, a first-in first-out (FIFO) register, an external input/output (I/O) interface register and an internal I/O interface register,
wherein upon execution of the executable code, the communication interface implemented by the programmable I/O system between the laser printer controller and the print mechanism comprises one or more of
a serial interface, a parallel interface, a serial peripheral interface (SPI), a Synchronous Serial Interface (SSI), a Micro Wire interface, an Inter Integrated Circuit (I2C) interface, a control area network (CAN) interface, a UART interface, an IEEE1284 interface, an LCD interface, a front panel interface, and a MODEM interface.

2. The programmable I/O system of claim 1, wherein the memory and the microcontroller are included in a same integrate circuit.

3. The programmable I/O system of claim 1, wherein the register file comprises a dual-ported register file configured to permit the microcontroller to perform a single-cycle read-modify-write access.

4. The programmable I/O system of claim 1, wherein:
the register configured to increment independently based on a predetermined timebase; and
the timer register is used to generate timing for the communication interface implemented by the programmable I/O system.

5. The programmable I/O system of claim 4, wherein the shared register is configured to be shared by i) the microcontroller and ii) a main system processor.

6. The programmable I/O system of claim 5, wherein the interrupt register is configured to provide interrupt-driven status to the main system processor.

7. The programmable I/O system of claim 6, wherein the FIFO is configured to perform bulk data transfers between the programmable I/O system and a system memory.

8. The programmable I/O system of claim 7, wherein:
the external I/O interface register is configured to control first electrical signals that are external to the programmable I/O system; and
the first electrical signals are associated with the communication interface implemented by the programmable I/O system.

9. The programmable I/O system of claim 8, wherein:
the internal I/O interface register is configured to control second electrical signals that are internal to the programmable I/O system; and the second electrical signals are associated with the communication interface implemented by the programmable I/O system.

10. The programmable I/O system of claim 1, further comprising a run control register configured to enable each of the memory and the microcontroller, wherein the microcontroller is enabled subsequent to the memory being loaded with the executable code.

11. A method for configuring a programmable I/O system to implement a communication interface between i) a laser printer controller and ii) a print mechanism, the method comprising:
during runtime of the laser printer controller and the print mechanism,
loading executable code into a memory, wherein the executable code is for configuring the programmable I/O system to implement the communication interface, and
executing the executable code loaded into the memory,
wherein upon execution of the executable code, the communication interface implemented by the programmable I/O system between the laser printer controller and the print mechanism comprises one or more of
a serial interface, a parallel interface, a serial peripheral interface (SPI), a Synchronous Serial Interface (SSI), a Micro Wire interface, an Inter Integrated Circuit (I2C) interface, a control area network (CAN) interface, a UART interface, an IEEE1284 interface, an LCD interface, a front panel interface, and a modem interface,
wherein the programmable I/O system comprises a register file in communication with the microcontroller, and
wherein the register file comprises a timer register, a shared register, an interrupt register, a first-in first-out (FIFO) register, an external input/output (I/O) interface register and an internal I/O interface register.

* * * * *